United States Patent
Takase et al.

(10) Patent No.: US 6,511,119 B2
(45) Date of Patent: Jan. 28, 2003

(54) BODY STRUCTURE OF VEHICLE

(75) Inventors: Minoru Takase, Tokyo-To (JP); Isao Itoi, Tokyo-To (JP); Isamu Nagasawa, Tokyo-To (JP)

(73) Assignee: Fuji Jukogyo Kabushiki Kaisha, Tokyo-To (JP)

(*) Notice: Subject to any disclaimer, the term of this patent is extended or adjusted under 35 U.S.C. 154(b) by 0 days.

(21) Appl. No.: 09/817,267

(22) Filed: Mar. 27, 2001

(65) Prior Publication Data

US 2001/0024053 A1 Sep. 27, 2001

(30) Foreign Application Priority Data

Mar. 27, 2000 (JP) ........................................ 2000-086577

(51) Int. Cl.[7] .............................................. B60R 19/00
(52) U.S. Cl. .................. 296/189; 296/203.02; 293/117; 280/784
(58) Field of Search ............................ 296/189, 203.02, 296/194, 188; 280/784; 293/117, 132, 133

(56) References Cited

U.S. PATENT DOCUMENTS 5,275,436 A * 1/1994 Pomero ................. 296/189 X
6,027,159 A * 2/2000 Baumann ................... 296/189
6,312,028 B1 * 1/2001 Wilkosz ................. 296/189 X

FOREIGN PATENT DOCUMENTS

| JP | 58-105883 | 6/1983 |
| JP | 6-16154 | 1/1994 |
| JP | 6-20170 | 3/1994 |
| JP | 8-268325 | 10/1996 |
| JP | 10-226363 | 8/1998 |

* cited by examiner

Primary Examiner—Joseph D. Pape
(74) Attorney, Agent, or Firm—Smith, Gambrell & Russell, LLP

(57) ABSTRACT

A body structure for a vehicle having a toe board opposite to a rear section of a front wheel, a side frame extending in a longitudinal direction of the vehicle and a bumper beam extending in a widthwise direction of the vehicle and connected with a front end of the side frame, includes an impact absorbing component provided in the side frame for absorbing an impact applied from the front side of the vehicle and a front wheel rotation guiding component provided at the bumper beam for guiding a front section of the front wheel so as to rotate inwardly when an impact is applied to the bumper beam.

4 Claims, 7 Drawing Sheets

BODY STRUCTURE OF VEHICLE

BACKGROUND OF THE INVENTION

1. Field of the Invention

The present invention relates to a body structure for a vehicle and more particularly to a body structure for a vehicle having a toe board opposite to a rear side of a front wheel.

2. Discussion of Related Arts

FIG. 5 is a perspective view showing a front portion of a vehicle as viewed from rear in the lengthwise direction of a vehicle body and FIG. 6 is a schematic sectional view taken along a line X—X of FIG. 5. As shown in FIG. 5, a vehicle body 1 has an engine room 3 in front of a passenger compartment 2. Further, there is provided a front wheel on a left side and a right side, respectively.

In FIG. 6, reference numeral 10 denotes a side frame extending along a left and right side in the lengthwise direction of a vehicle 5.

There is provided a collapsible section 11 (impact absorbing means) at the front portion of the side frame 10. The collapsible section 11 is constituted by a plurality of beads (not shown) so that the side frame 10 is successively, smoothly collapsed from the front end thereof.

Reference numeral 100 denotes a bumper beam which is a skeleton member of a bumper provided at the front end of the vehicle 5 and extending in the widthwise direction of the vehicle 5. The bumper beam 100 extends in the widthwise direction of the vehicle 5 and is secured to respective front ends of the left and right side frames 10, 10. There is provided a front wheel 4 behind a protrusion 100a outwardly protruded from the side frame 10. The front wheel 4 is rotatably supported by body members such as the side frame 10 through a suspension system (not shown). Further, the front wheel 4 is connected with a steering system (not shown) interlocking with a steering wheel (not shown) in the passenger compartment 2 so as to steer the front wheel 4.

Further, there is provided a sheet like toe board 13 for partitioning between the engine room 3 and the passenger compartment 2 in a rear side position of the front wheel 4. The toe board 13 is connected at the respective left and right ends thereof with a side sill 15 respectively extending along the left and right side of the passenger compartment 2 in the lengthwise direction of the vehicle 5. Further, reference numeral 14 denotes a reinforcement connecting both left and right side sills 15, 15 in cooperation with the toe board 13. The reinforcement 14 forms a torque box having a closed cross section.

When an impact load P is applied to the vehicle 5 from the front side thereof, the collapsible section 11 of the side frame 10 is collapsed from the front end thereof and deformed. As a result, the impact energy is absorbed and an impact upon the passenger compartment 2 is alleviated.

However, when the front wheel 4 is in a straight running condition, in case where an offset impact load is applied from the front side to a vehicle constituted as shown in FIG. 6, the protrusion 100a of bumper beam 100 is pushed backward and as a result the front wheel 4 goes back. The front wheel 4 traveling backward displaces the toe board 13 and the side sill 15 backward. As a result since the front wheel 4 is interleaved with the bumper beam 100 and the toe board 13, it is difficult to secure an adequate clash stroke, this leading to an enlarged damage on the passenger compartment.

SUMMARY OF THE INVENTION

It is an object of the present invention to provide a vehicle body structure capable of protecting an occupant by controlling the deformation of a toe board when an impact load is applied to a vehicle from the front side thereof.

In order to achieve the object, the body structure comprises an impact absorbing means provided in a side frame for absorbing an impact applied from the front side of the vehicle and a front wheel rotation guiding means provided in a bumper beam for guiding a front section of a front wheel so as to rotate inwardly when an impact is applied to the bumper beam.

DETAILED DESCRIPTION OF THE PREFERRED EMBODIMENT

Figure 1:
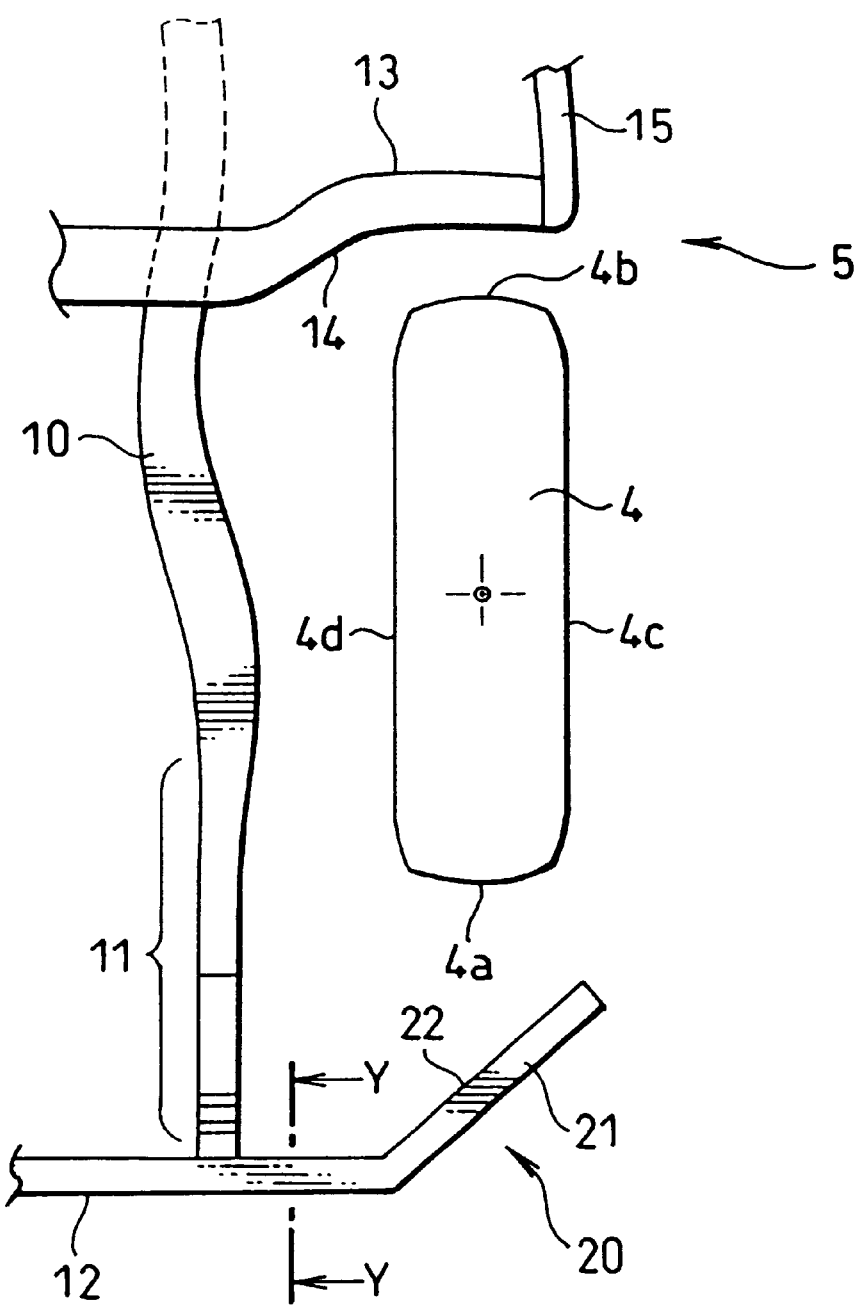
FIG. 1 is a schematic view of a body structure according to an embodiment of the present invention.

Referring now to FIG. 1, reference numeral 10 denotes a side frame and reference numeral 12 denotes a bumper beam. The side frame 10 is connected at the front end thereof with the bumper beam 12 extending in the widthwise direction of a vehicle. A protrusion of the bumper beam 12 extends in the widthwise direction of the vehicle outwardly from the connecting portion of the bumper beam 12 and the side frame 10. The protrusion is connected at the side end thereof with a front wheel rotation guiding means 20 described below.

The front wheel rotation guiding means 20 is formed by a side member 21 outwardly extending in a diagonally backward direction and a guide plate 22 provided behind the side member 21. The side member 21 has a U-shaped or closed cross section and is disposed at almost the same height as a wheel axis. The top end of the side member 21 is located outside of an outer side surface 4c of the front wheel 4. The guide plate 22 faces a front section 4a of the front wheel 4.

The guide plate 22 is disposed so as to rotate the front wheel 4 in a steering direction, that is, so as to allow the front section 4a of the front wheel 4 to come close to the side frame 10, when the guide plate 22 moves backward by an impact load from front and contacts the outer side surface 4c of the front wheel 4. The surface of the guide plate 22 opposite to the front wheel 4 may have a flat or concave configuration.

Figure 2:
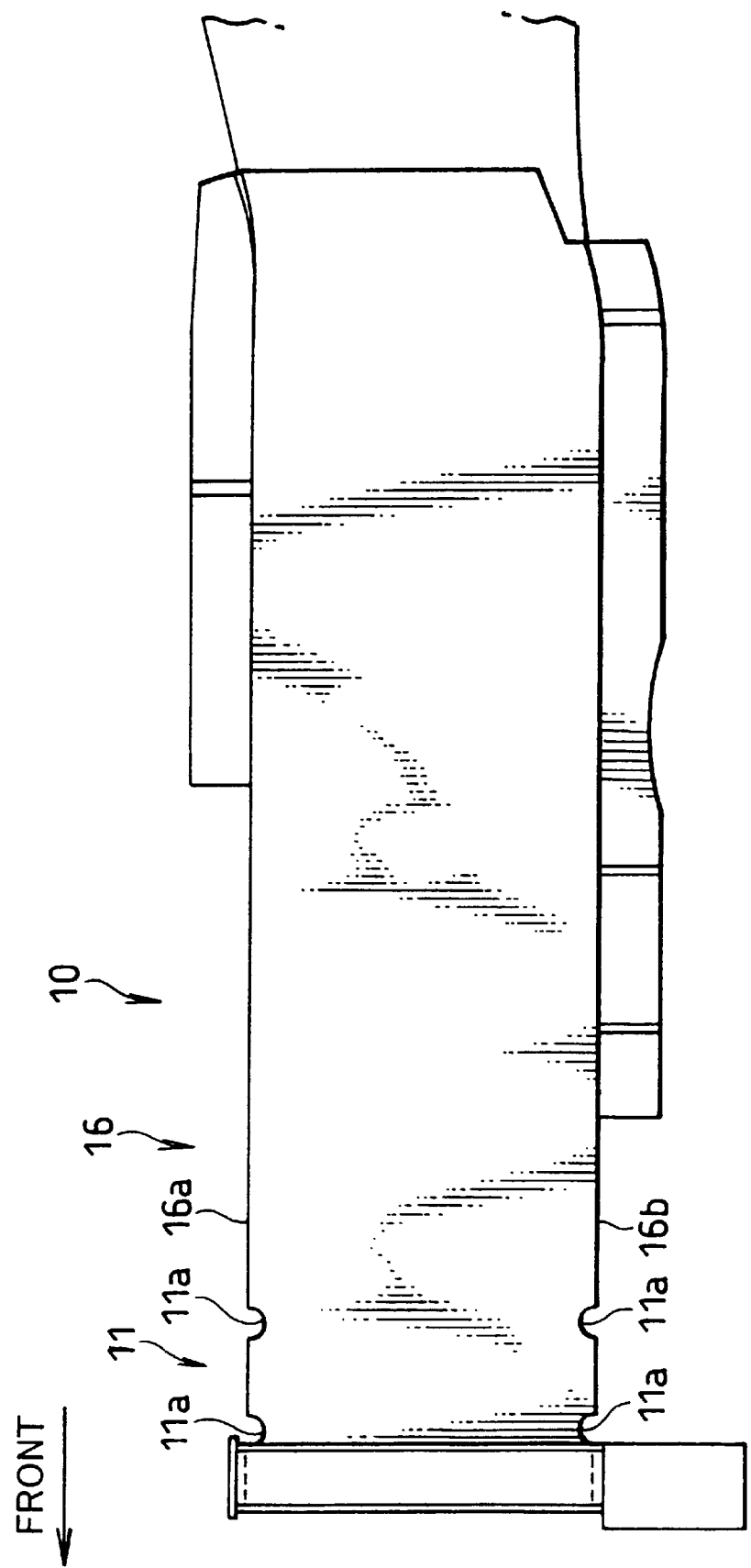
FIG. 2 is a sectional view taken along a line Y—Y of FIG. 1.

As shown in FIG. 2, the side frame 10 has a front reinforcement 16 including a collapsible section 11 (impact absorbing means) at the front thereof. The front reinforcement 16 has a rectangular closed cross section formed by the combination of U-shaped steel plates.

A plurality of crush beads 11a having a concave groove configuration and extending in the widthwise direction of the vehicle are provided at a specified interval on a top surface 16a and a bottom surface 16b of the front reinforcement 16, respectively.

When an impact load larger than a specified value is applied, the crush beads 11a induces the side frame 10 to collapse successively backward. The front reinforcement 16 absorbs an impact energy by the collapse and deformation of itself, thereby the impact absorption of the side frame 10 is secured.

Figure 3:
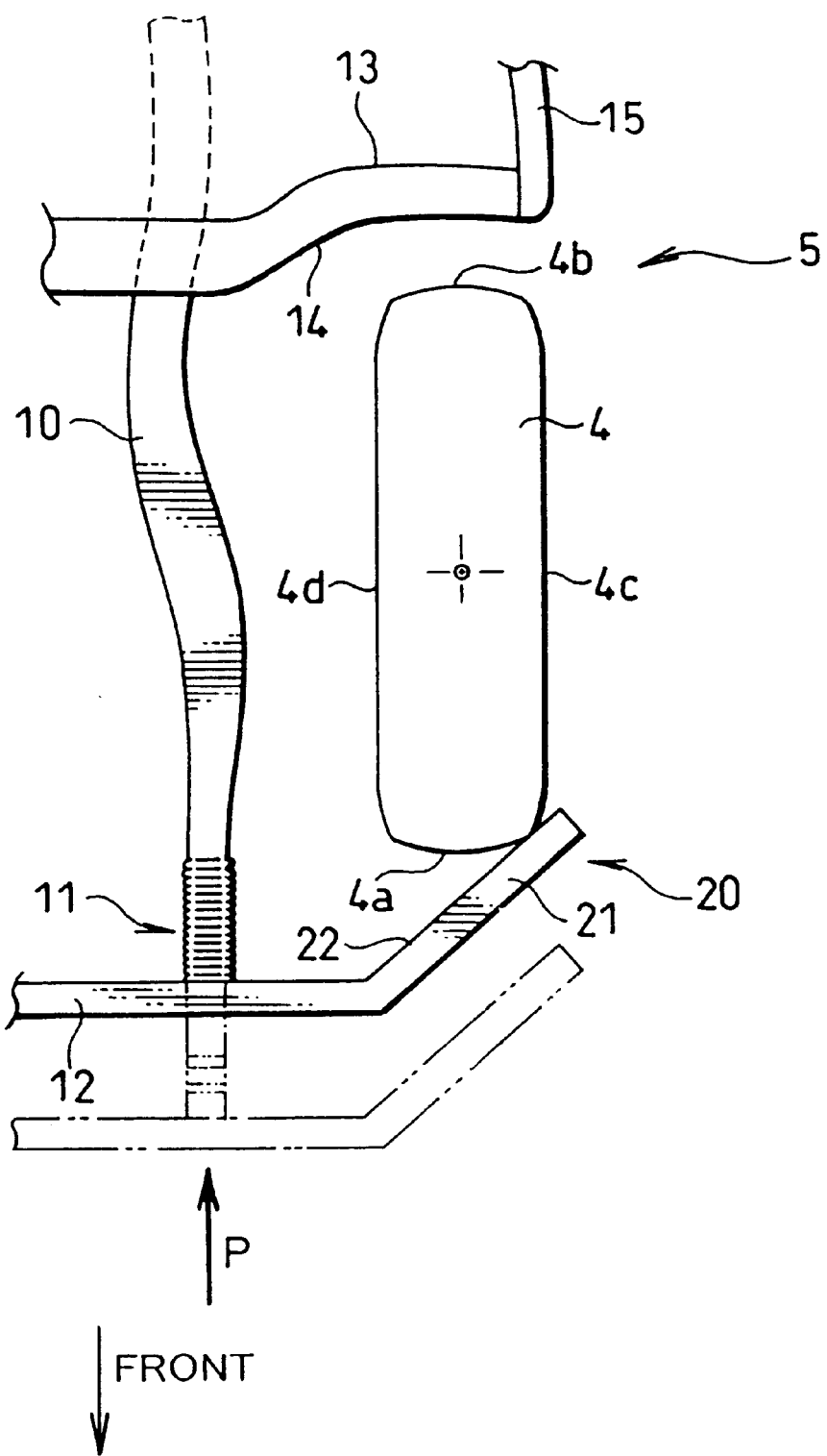
FIG. 3 is a view showing a bumper beam before contacting a front wheel.
Figure 4:
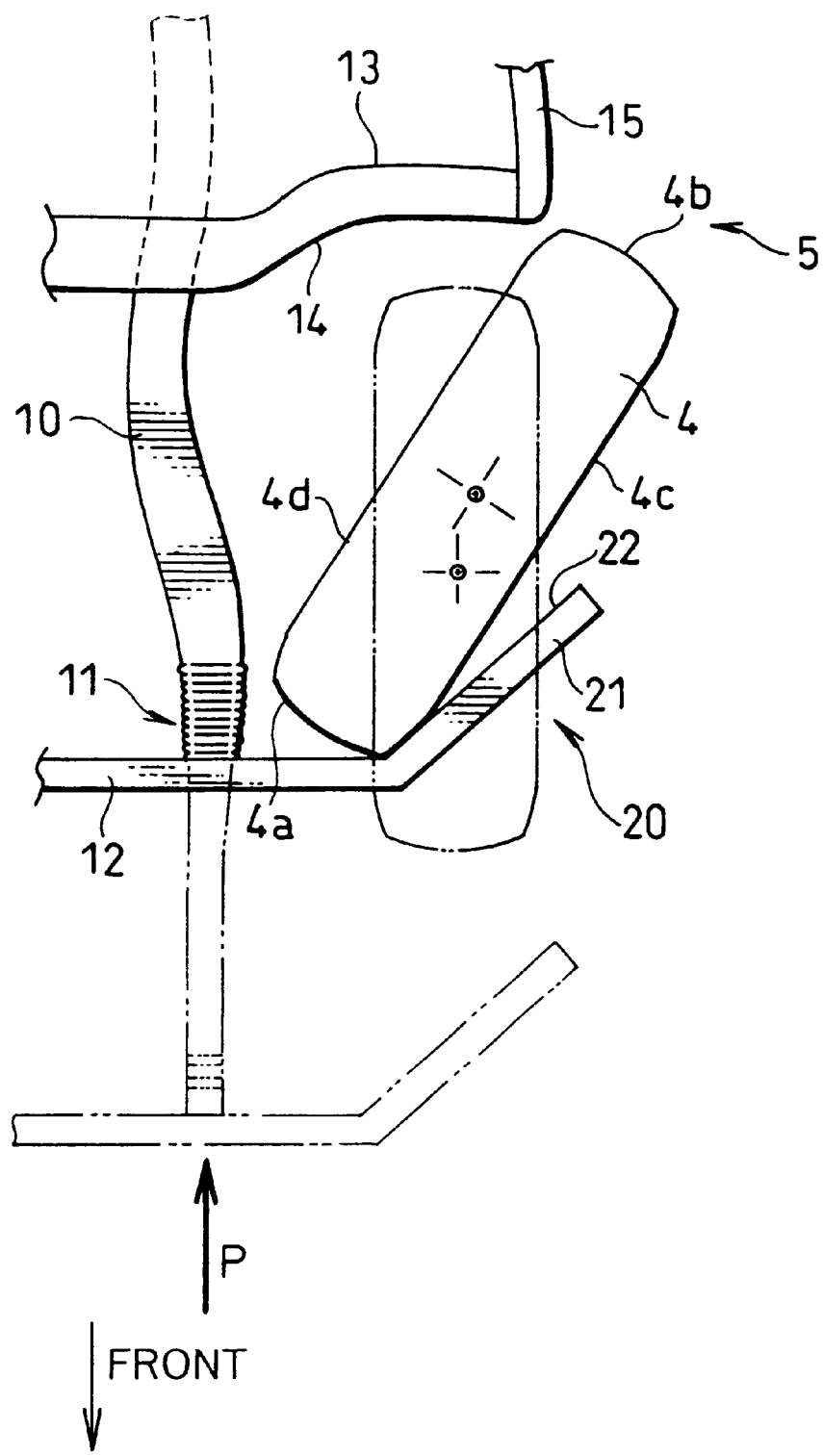
FIG. 4 is a view showing a bumper beam after contacting a front wheel.
Figure 5:
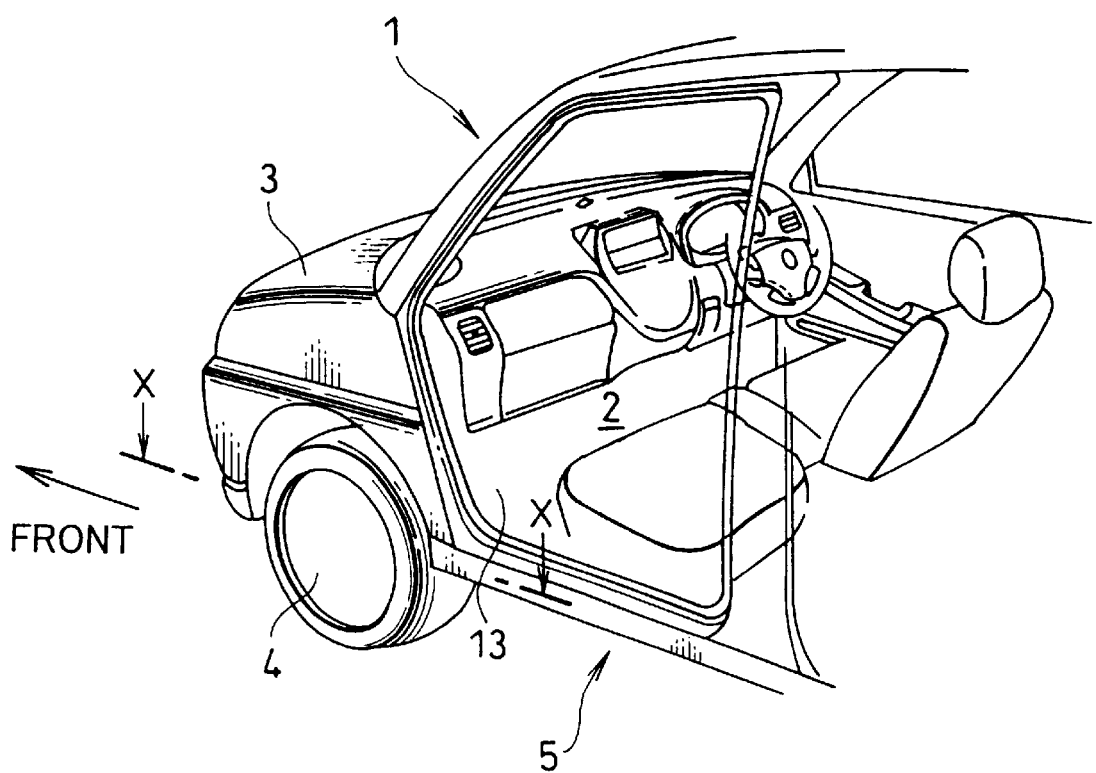
FIG. 5 is a perspective rear view of a front portion of a vehicle.
Figure 6:
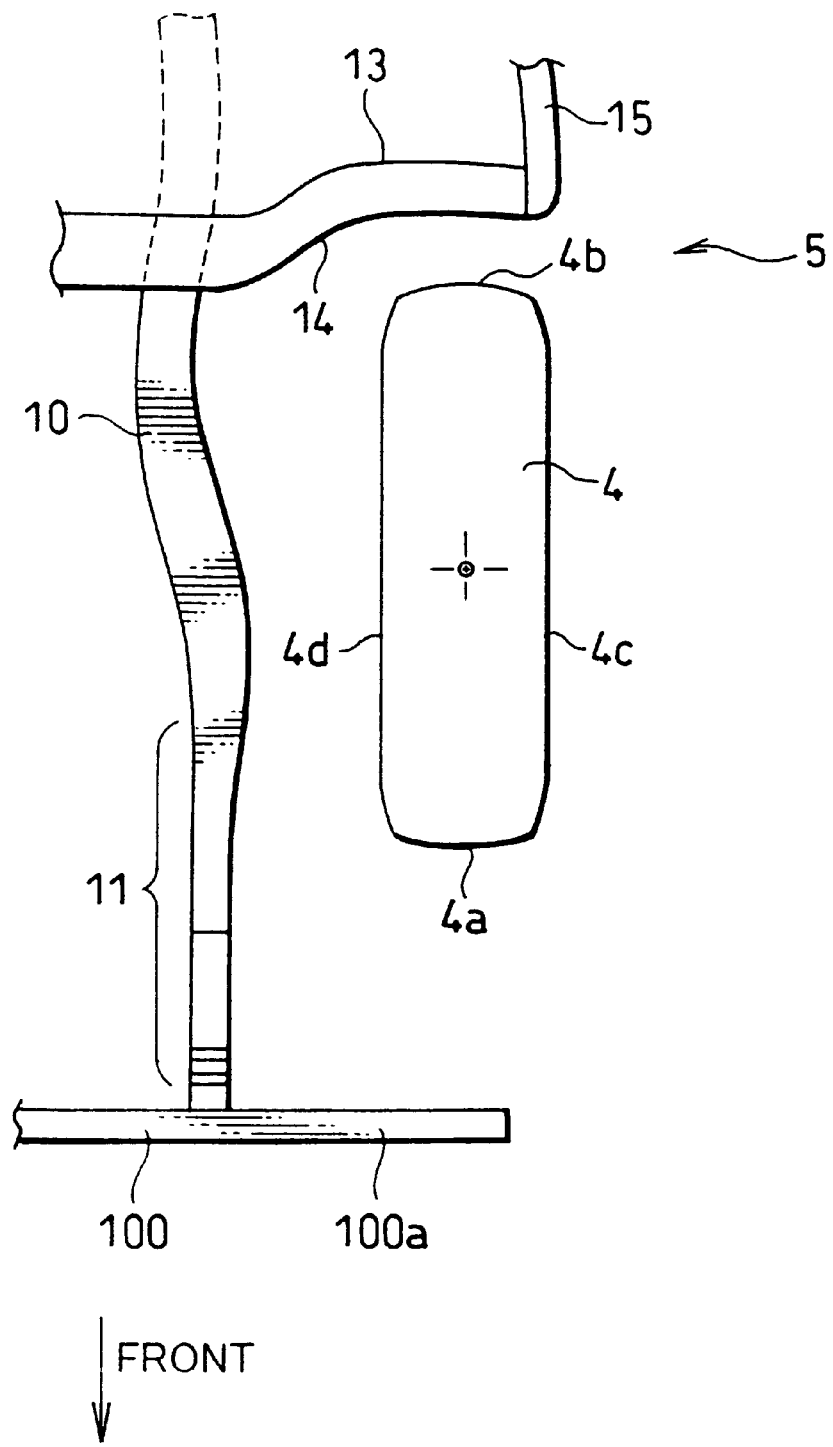
FIG. 6 is a schematic view showing a-conventional body structure.
Figure 7:
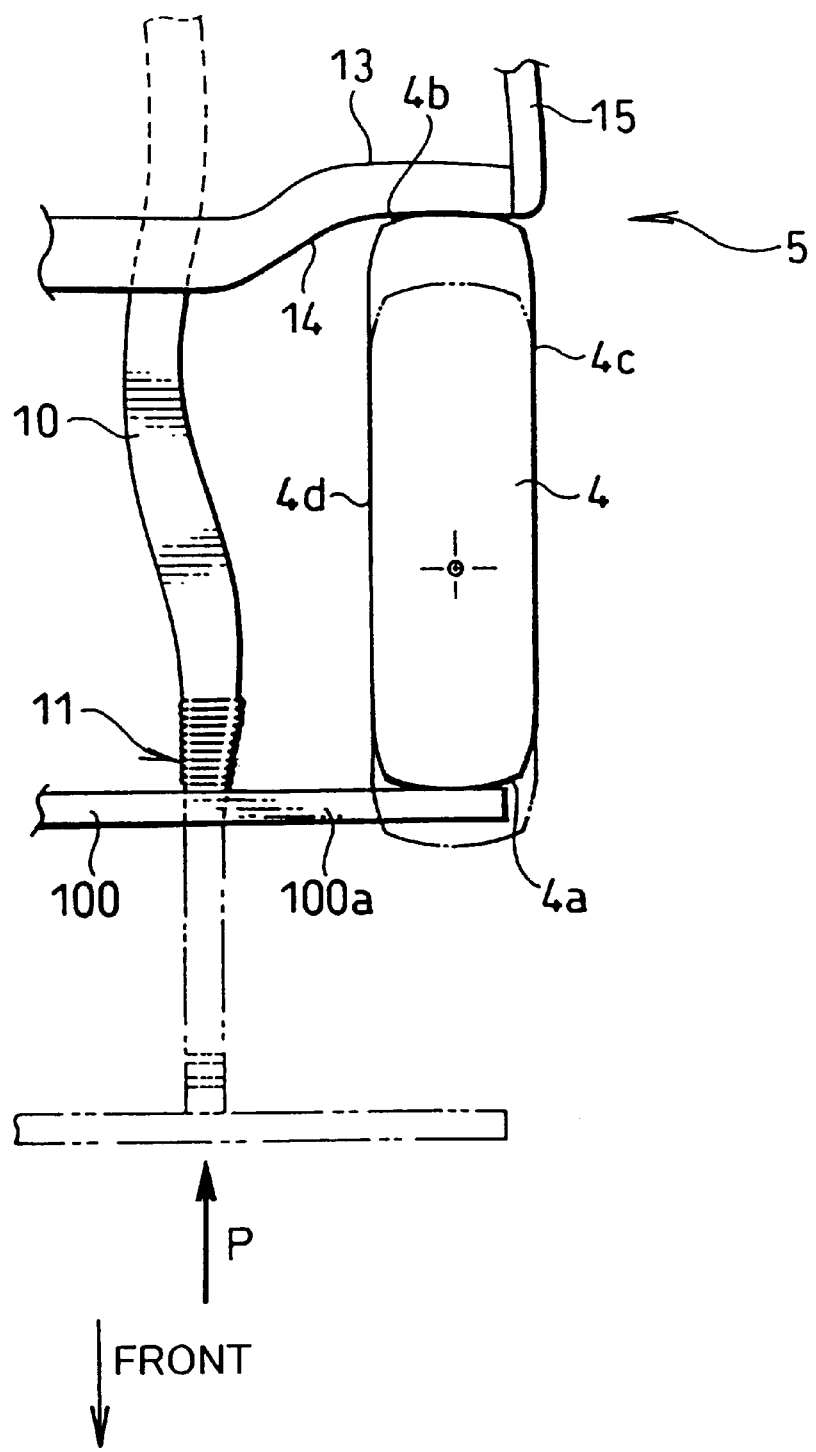
FIG. 7 is a schematic view showing a conventional body structure when an impact load is applied from the front side of a vehicle.

FIGS. 3 and 4 are schematic views for explaining the process of the guidance of rotation of the front wheel by the front wheel rotation guiding means 20. When an impact load larger than a specified value is applied to either of left and right side frames, that is, when an offset impact occurs, the side frame 10 is successively from the front end thereof, smoothly collapsed with the help of the collapsible section 11 of the front reinforcement 16. Accordingly, the impact energy is absorbed in a relaxed manner and as a result an effect of the impact on the passenger compartment is alleviated.

As a result of the collapse and deformation of the collapsible section 11, when the bumper beam 12 moves backward, the front wheel rotation guiding means contacts the front wheel 4. In case where the front wheel 4 is oriented in a straight running direction, as shown in FIG. 3, the front outer corner of the front wheel 4 contacts the guide plate 22 of the front wheel rotation guiding means 20.

When the bumper beam 12 further moves backward by the deformation of the collapsible section 11, as shown in FIG. 4, the front wheel 4 is pushed at the front section 4a thereof by the guide plate 22 and is guided so as to be oriented in an inward direction of the vehicle. Hence, the rear section 4b of the front wheel 4 is moved outwardly and as a result an opposing relationship of the rear section 4b against the toe board 13 is released. As a result, the toe board 13 can be prevented from being deformed by the regression of the front wheel 4, thereby occupants can be protected from impact.

In this embodiment, the front wheel rotation guiding means 20 acts as guiding the front section 4a of the front wheel 4 in an inward direction of the vehicle, however this front wheel rotation guiding means 20 may be constituted so as to guide the front section 4a outwardly. Also in this case, since the toe board can be prevented from being deformed by the regressing front wheel, occupants can be protected.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A body structure for a vehicle having a toe board opposite to a rear section of a front wheel, a side frame extending in a longitudinal direction of said vehicle and a bumper beam extending in a widthwise direction of said vehicle and connected with a front end of said side frame, comprising:

an impact absorbing means provided in said side frame for absorbing an impact applied from the front side of said vehicle; and a front wheel rotation guiding means extending directly from said bumper beam for guiding a front section of said front wheel, wherein said front wheel rotation guiding means extends outwardly in a widthwise direction of said vehicle and includes a guide plate extending outwardly, diagonally and rearwardly so as to come in contact with and rotate said front wheel inwardly when an impact is applied to said bumper beam.

2. The body structure according to claim 1, wherein said impact absorbing means includes a collapsible section collapsing successively from front to rear when an impact is applied to said side frame from the front.

3. The body structure according to claim 1, wherein said front wheel rotation guiding means extends outwardly in a widthwise direction of said vehicle and includes a guide plate extending outwardly, diagonally and rearwardly so as to rotate said front wheel inwardly, when an impact is applied to said bumper beam.

4. A vehicle equipped with the body structure defined of claim 1.

* * * * *